United States Patent
Kolomick

[11] 3,762,046
[45] Oct. 2, 1973

[54] HAND TOOL FOR EDGING GYPSUM BOARD

[76] Inventor: Paul Kolomick, 9 Viking Rd., Glenwood Landing, N.Y. 11547

[22] Filed: May 3, 1971

[21] Appl. No.: 139,538

[52] U.S. Cl.............. 30/172, 7/14.1 R, 29/80, 145/20, 145/129
[51] Int. Cl............. B08b 9/02, B67b 7/30
[58] Field of Search............ 145/17, 20, 129; 29/78, 80; 30/123, 169, 171, 280, 172; 7/1 M, 17; 33/42; 76/82, 83

[56] References Cited
UNITED STATES PATENTS

| | | | |
|---|---|---|---|
| 3,391,946 | 7/1968 | Luff | 76/83 X |
| 2,816,351 | 12/1957 | Sauers | 29/78 |
| 3,644,993 | 2/1972 | Chupp | 30/280 |
| 2,420,469 | 5/1947 | Doniger | 145/129 X |
| 2,818,644 | 2/1958 | Crawford | 30/293 |
| 2,952,025 | 9/1960 | Johnson | 7/14.1 |
| 931,992 | 8/1909 | Campagna | 29/80 X |
| 1,175,512 | 3/1916 | Flemal | 30/172 |
| 2,983,943 | 5/1961 | Fendler | 30/172 X |

FOREIGN PATENTS OR APPLICATIONS

| | | | |
|---|---|---|---|
| 204,275 | 9/1923 | Great Britain | 30/172 |

*Primary Examiner*—Othell M. Simpson
*Attorney*—James A. Eisenman and Robert R. Strack

[57] ABSTRACT

There is disclosed a compact hand tool for squaring and smoothing the break line of gypsum or plasterboard in which a plurality of transverse coplanar cutting edges define recesses having a length exceeding the width of the board and having a predetermined depth to provide chambers for accumulating and discharging the powdered residue so that clogging is prevented. The back side of the wall holding the cutting blades is formed with a shallow right-angle channel defining a slide for carrying a ruling gauge to position a scoring knife a precise distance inward from the edge of the board so that the surface of the ruler does not rub on the board to obliterate its gauge marks.

7 Claims, 3 Drawing Figures

PATENTED OCT 2 1973　　　　　　　　　3,762,046

INVENTOR
PAUL KOLOMICK

BY
Eisenman & Strack
ATTORNEYS

HAND TOOL FOR EDGING GYPSUM BOARD

BACKGROUND OF THE INVENTION

In the installation of gypsum or plasterboard panels or so-called dry-wall construction, boards of standardized dimension are cut to size on the job. The preferred method of cutting involves socring with a sharp blade held in a hand tool and guided by a gauging ruler. The socring operation cuts through the fibrous surface layer, after which the board is broken by bending. The broken edge, while conforming with some precision to the score line, is invariably rough in the gypsum core. Good workmanship requires that the rough edges by smooth and square, and it is conventional in the art to utilize a hand rasp or rasp-type tool, and sometimes the scoring knife to prepare a more or less clean edge.

A difficulty encountered with such prior art devices and techniques is that they tend to become clogged with the gypsum powder from the core of the wallboard. Also, conventional rasps and similar filing tools present difficulties because they operate in a single direction only, often causing ragged edges when inadvertently operated in the reverse direction and in general consuming time and effort of the mechanic.

It is, therefore, one object of the present invention to provide a convenient hand tool for dressing the ragged edge of cut wallboard which overcomes the problem of clogging and of one-directional movement which are characteristic of presently used devices.

Another object of the invention is to provide a multiple purpose hand tool for assisting, for example, in the preparation of gypsum or plasterboard by performing such operations as scoring without subjecting either the ruling gauge or the hands of the user to wear and abrasion and which can be used as a compass gauge for scribing circles.

BRIEF DESCRIPTION OF THE INVENTION

In accordance with the present invention, there is provided a compact hand tool having a plurality of, say, seven transverse cutting blades having a length which slightly exceeds the width of the wallboard and which are spaced apart, preferably for a distance slightly less than their lengths, to define a series of chambers. The blades are carried rigidly in an upstanding wall which can be formed integrally with a flat base plate adapted to overlie and ride upon a surface of the board. When placed upon the board, with the working edges of the blades abutting the ragged edge, the tool can be conveniently slid up and down along the cut with two or three strokes shaving the edge to a clean square.

The back of the wall defining the cutting blades and an extension surface of the base plate define a relatively shallow notch adapted to receive a clean edge of the wallboard and to slide easily along that edge. In such attitude, the then upwardly facing surface of the base plate is used as a carrier for the ruling gauge, by including a transverse channel with an edge-loading spring to clamp the ruler in place. A gauge mark in the channel tells the workman the precise location of the wallboard edge which is slidably received in the right-angle groove beneath. Thus arranged, the tool is slid along the board with the scribing knife held at the edge of the ruler, and a precisely measured piece is thereby scored for breaking, with the ruling gauge at no time sliding in direct contact with the board surface. If desired, a compass scribing center and additional positioning slots can be provided in the base for performing other operations.

THE PREFERRED EMBODIMENT

Figure 1:
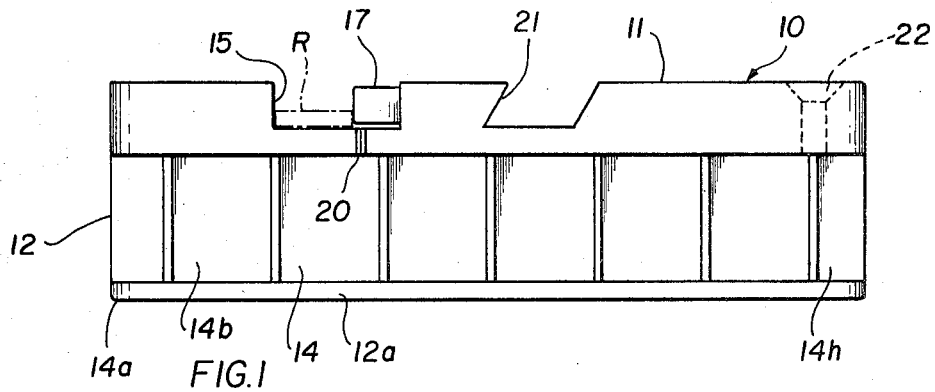
FIG. 1 is a view in side elevation of a tool for assisting in the preparation of gypsum or plasterboard.
Figure 2:
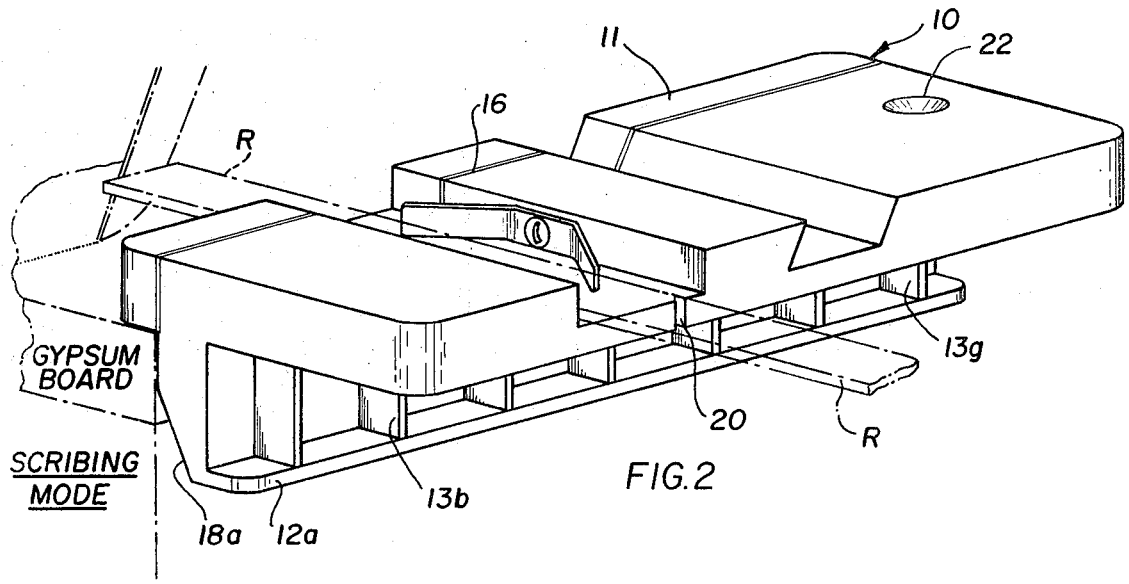
FIG. 2 is a view in perspective of the tool of FIG. 1, showing the detail of the back surface of the base plate and showing a portion of the cutting head and blades which extend perpendicularly therefrom.

The invention is illustrated as embodied in a hand tool 10 including a base or carrier plate 11, from which extends in a perpendicular direction a blade mounting member 12 having an overhanging edge piece 12a. Firmly anchored in the carrier member 12 between the overhanging edge piece 12a and the underside 11a of the carrier plate 11 are a plurality of cutting blades 13a.–13g. The blades 13a.–13g are precisely perpendicular to the plane of the under surface 11a of the plate 11 and also of the inner surface 12b of the carrier member 12, and the exposed edge of each of the blades is ground square to form two cutting edges, one capable of cutting when the tool is slid in one direction and the other when it is slid in the opposite direction as described below.

Figure 3:
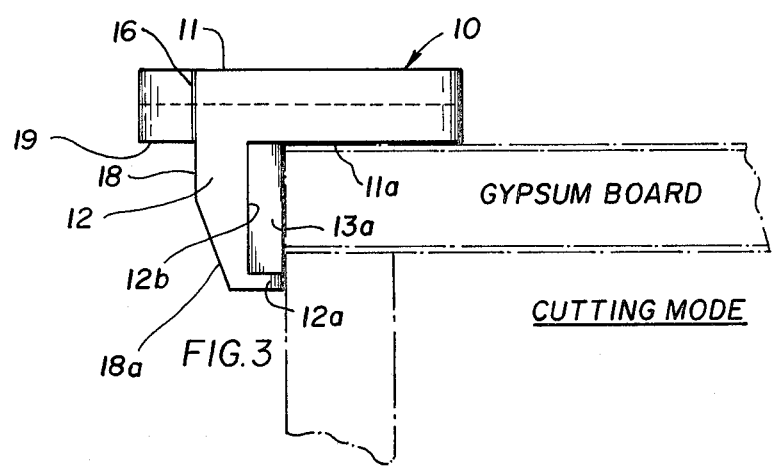
FIG. 3 is a view in end elevation of the tool.

The lengths of the respective blades 13a.–13g are preferably slightly in excess of the widest gypsum or plasterboard to be processed (illustrated in phantom lines in FIG. 3). The respective blades are spaced apart laterally, preferably for a distance slightly less than their lengths and have a depth which is preferably slightly less than the lateral spacing to define a series of chambers 14a.–14h. In one working embodiment of the invention, a blade length of approximately seven-eighths in. was chosen, together with a blade spacing of approximately three-fourths in. and a blade depth of approximately three-eighths in.

The back side of the carrier plate 11 is formed with a transverse slot 15 across which a gauging or edge-reference line 16 can be formed and to one side of which is attached a spring clip 17 adapted to receive a ruling gauge (shown in phantom lines and identified by the numeral R in FIG. 1) for the purpose of scribing score lines into the work. To this end, the back side 18 of the carrier member 12 defines a shallow, slide surface which is perpendicular with respect to an extension 19 on the left-hand end of the carrier plate 11 as viewed in FIG. 3, and which is precisely coplanar with the reference line 16 on the opposite surface of the tool. The perpendicularly oriented surfaces 18 and 19 define a shallow rectangular notch adapted to engage a finished edge of a piece of gypsum or wallboard to be slid therealong during scoring. With the ruler R secured in its channel 15 by the spring clip 17, the ruler R will read the exact scoring distance from the edge of the board by reference to the line 16. For example, if a score line is to be made three inches inward from the edge of the gypsum board, the calibration mark on the ruler corresponding to three inches is placed in register with the gauging or reference line 16.

The workman, by placing his scoring knife against the free end of the gauging ruler and by sliding the tool along the edge of the board, achieves the desired score line penetrating the fibrous sheet on the surface of the gypsum board. It will be observed that the depth of the notch as measured by the length of the flat surface 18 is less than the thickness of a single gypsum board, with that portion of the member 12 which is disposed beyond the surface 18 being formed with a chamfer 18a inclined away from the edge of a gypsum board received within the notch. In this fashion, it is possible to score the top board of a stack of boards without danger of gaining a false reference from the protruding edge of a board lower in the stack. Also it will be observed that the gauging ruler is carried by the tool a slight distance above the upper surface of the gypsum board being scored so that the ruler with its perishable gauge marks is not rubbed on the board surface.

The gypsum board is then broken by a sharp blow leaving the characteristic rough edge of gypsum or plaster between the fibrous surfaces. At this point, the tool is turned around and brought into engagement with the squared ground edges of the blades 13 abutting the rough broken edge of the gypsum board and the surface 11a overlying a plane of the board. The tool is then drawn back and forth two or three times, cutting for each direction of motion with plaster or gypsum powder being accumulated in the chambers 14a–14h, from which it is able to spill out due to the fact that the chambers are slightly longer than the thickness of the board. Thus, the tool is non-clogging.

It will be seen in FIG. 3 that when the tool is used to clean and square the edge of a piece of wallboard which forms a corner in conjunction with a perpendicularly arranged piece (the vertical piece as viewed in FIG. 3), the overhanging edge piece 12a of the blade-supporting member 12 will engage the face of the perpendicular wallboard to define the square cut on the edge of the horizontal piece. The coplanar relationship between the cutting surfaces of the blades 13 and the overhanging edge piece achieves this desired automatic control of the depth of the cut.

If desired, a second groove 21 having inclined side walls can be formed in the back side of the carrier plate 11 to receive a ruler which can be held by the thumb of the opposite hand, pressing the ruler under the overhanging edge of the left hand side of the slot as viewed in FIG. 1. Thus, the grooves 15 and 21 perform similar functions. A hole 22 can be provided in the tool for hanging on a hook or nail. The tool can also be used as a compass to inscribe circles in plasterboard by means of a notch 20 for accommodating a pivot, such as a nail (not shown), driven into the wallboard surface. A ruler to measure the radius of the circular cut is clamped in the notch 15, with ruler edge abutting the pivot. It should be noted that when the tool is operated in its scribing mode, the tool serves to prevent the hands of the mechanic from engaging the board and rubbing thereagainst. Thus, splinters, glass fragments and the like which are often present in wallboard do not injure the hands of the user. Wallboard mechanics characteristically tape their fingers to prevent such injury.

While the invention has been described above with reference to a preferred embodiment thereof, it will be understood that it can take various other forms and arrangements within the scope of the invention and should not, therefore, be regarded as limited except as defined in the following claims:

I claim:

1. In a hand tool for square edging gypsum board, a carrier plate for sliding movement along a plane surface of the board and a blade assembly extending perpendicularly from the plane of the sliding surface, comprising a plurality of parallel, laterally spaced apart blade elements having coplanar cutting edges adapted to be brought into engagement with the rough edge of the board, said blades having a length exceeding the thickness of the board and also having a depth and lateral spacing to define chambers for receiving gypsum powder as the tool is moved along the board in either direction, said blade assembly including a rigid imperforate back wall on the opposite edges of the blades from their cutting surfaces and including an overhanging edge piece spaced from the carrier plate and having its leading edge substantially coplanar with the cutting edges of the blades, the cutting edge of each blade being squared to form two sharp edges on each blade capable of cutting for either direction of movement of the tool, said blades being anchored at their respective ends to both the overhanging edge piece and to the carrier plate.

2. Apparatus as set forth in claim 1, including means defining a shallow elongated edge-engaging right-angle notch and gauge ruler positioning means for holding a gauging ruler perpendicular to the axis of the notch parallel to the surface thereof which is adapted to overlie the plane of the board, said gauge ruler positioning means including means to hold the gauge ruler at a point spaced slightly away from the plane of the board when the notch is in sliding engagement with an edge of the board, whereby a score line can be made in the board by holding a scoring knife against the end of the gauge ruler and sliding the tool along the board edge.

3. Apparatus as set forth in claim 2, said gauging ruler holding means comprising a channel formed in said carrier plate on the opposite side thereof from said blade assembly, and also on the opposite side from said notch, and gauge means in said channel marking a line disposed in the precise plane of one edge of the notch beneath, thereby to indicate on the groove side of the tool the precise location of the board edge received in the notch to define a reference for the gauge ruler.

4. Apparatus as set forth in claim 3, including spring clip means to position the gauge ruler in the channel.

5. Apparatus as set forth in claim 3, said blade assembly including an imperforate back wall extending perpendicular to the plane of said carrier plate, said notch being defined by a portion of the under side of the carrier plate and by a portion of the back side of said imperforate back wall of the blade asembly.

6. Apparatus as set forth in claim 5, said notch having a depth perpendicular to the plane of the board which is less than the board thickness, said imperforate wall of the blade assembly being inclined away from the notch below the edge-engaging wall thereof.

7. Apparatus as set forth in claim 2, including a pivot notch formed in the edge of said channel to form a pivot for scribing a circle having a radius references to the length of a gauging ruler projecting from the channel beyond the pivot notch.

* * * * *

UNITED STATES PATENT OFFICE
CERTIFICATE OF CORRECTION

Patent No. 3,762,046  Dated October 2, 1973

Inventor(s) Paul Kolomick

It is certified that error appears in the above-identified patent and that said Letters Patent are hereby corrected as shown below:

Column 1, in each of lines 7 and 9, change "socring" to --scoring--.

Signed and sealed this 19th day of February 1974.

(SEAL)
Attest:

EDWARD M. FLETCHER, JR.
Attesting Officer

C. MARSHALL DANN
Commissioner of Patents